US012689903B2

(12) United States Patent
Dutz et al.

(10) Patent No.: US 12,689,903 B2
(45) Date of Patent: Jul. 21, 2026

(54) UWB RECEIVER AND METHOD OF OPERATION

(71) Applicant: NXP B.V., Eindhoven (NL)

(72) Inventors: Jan Dutz, Hart bei Graz (AT); Michael Rath, Graz (AT); Wolfgang Küchler, Graz (AT)

(73) Assignee: NXP B.V., Eindhoven (NL)

( * ) Notice: Subject to any disclaimer, the term of this patent is extended or adjusted under 35 U.S.C. 154(b) by 583 days.

(21) Appl. No.: 18/187,567

(22) Filed: Mar. 21, 2023

(65) Prior Publication Data

US 2023/0345250 A1 Oct. 26, 2023

(30) Foreign Application Priority Data

Apr. 26, 2022 (EP) .................................... 22170140

(51) Int. Cl.
| | |
|---|---|
| *H04W 12/122* | (2021.01) |
| *H04L 7/027* | (2006.01) |
| *H04L 9/32* | (2006.01) |

(52) U.S. Cl.
CPC ........... *H04W 12/122* (2021.01); *H04L 7/027* (2013.01); *H04L 9/3297* (2013.01)

(58) Field of Classification Search
CPC ..... H04W 12/122; H04L 7/027; H04L 9/3297
See application file for complete search history.

(56) References Cited

U.S. PATENT DOCUMENTS

| | | | |
|---|---|---|---|
| 10,715,355 B2 | 7/2020 | Baier et al. | |
| 2016/0350987 A1* | 12/2016 | Zivkovic ................. | G07C 9/20 |
| 2021/0084499 A1 | 3/2021 | Kuchler et al. | |

(Continued)

FOREIGN PATENT DOCUMENTS

| | | | | |
|---|---|---|---|---|
| EP | 3793147 A1 | 3/2021 | | |
| WO | 2016/023600 A1 | 2/2016 | | |
| WO | WO-2017134310 A1 * | 8/2017 | .......... | H04J 13/0077 |

OTHER PUBLICATIONS

IEEE, "IEEE Standard for Low-Rate Wireless Networks; Amendment 1: Enhanced Ultra Wideband (UWB) Physical Layers (PHYs) and Associated Ranging Techniques," IEEE Computer Society, IEEE Std 802.14.4z, Jun. 4, 2020, 174 pages.

(Continued)

*Primary Examiner* — Elton Williams

(57) ABSTRACT

In accordance with a first aspect of the present disclosure, an ultra-wideband (UWB) receiver is provided, comprising: an attack mitigation unit configured to mitigate one or more attacks on a correlation function; a correlation unit configured to perform the correlation function by correlating an input signal received by the UWB receiver with a predefined sequence and to generate a correlation output based on correlating said input signal with the predefined sequence; and a first path detection unit configured to receive the correlation output and to detect a first path by evaluating the correlator output during a correlation window, said correlation window being a predefined period of time. In accordance with a second aspect of the present disclosure, a corresponding method of operating a UWB receiver is conceived. In accordance with a third aspect of the present disclosure, a computer program is provided for carrying out said method.

20 Claims, 16 Drawing Sheets

(56)            References Cited

U.S. PATENT DOCUMENTS

2021/0088645 A1\*   3/2021   Casamassima  ......   H04B 1/7163

OTHER PUBLICATIONS

Stocker et al., "Towards Secure and Scalable UWB-based Position-ing Systems," 2020 IEEE 17th International Conference on Mobile Ad Hoc and Sensor Systems (MASS), Dec. 10-13, 2020, 9 pages.
Domuta et al., "Localization in 802.15.4z Standard ," 2020 Inter-national Workshop on Antenna Technology (iWAT), Feb. 25-28, 2020, 4 pages.
Batur et al., "LNA-ESD-PCB Codesign for Robust Operation of IR-UWB Non-coherent Receiver", 14th International Conference on Synthesis, Modeling, Analysis and Simulation Methods and Applications to Circuit Design, Jun. 12, 2017, pp. 1-4, IEEE, Piscataway, NJ, USA.
Singh et al., "UWB with Pulse Reordering: Securing Ranging against Relay and Physical-Layer Attacks", International Associa-tion for Cryptologic Research, Jun. 12, 2018, pp. 1-14, vol. 20180612:143249, retrieved from the internet at http://eprint.iacr.org/2017/1240.pdf on Jun. 12, 2018.
Sun et al., "Integrity protection to support secure ranging in IR-UWB", Project: IEEE P802.15 Working Group for Wireless Spe-cialty Networks (WSN), Jan. 23, 2022, pp. 1-20, IEEE Draft, vol. 802.15.4ab, retrieved from the internet at https://mentor.ieee.org/802.15/dcn/22/15-22-0072-00-04ab-integrity-protection-to-support-secure-ranging-in-ir-uwb.pptx on Jan. 23, 2022.

\* cited by examiner

500

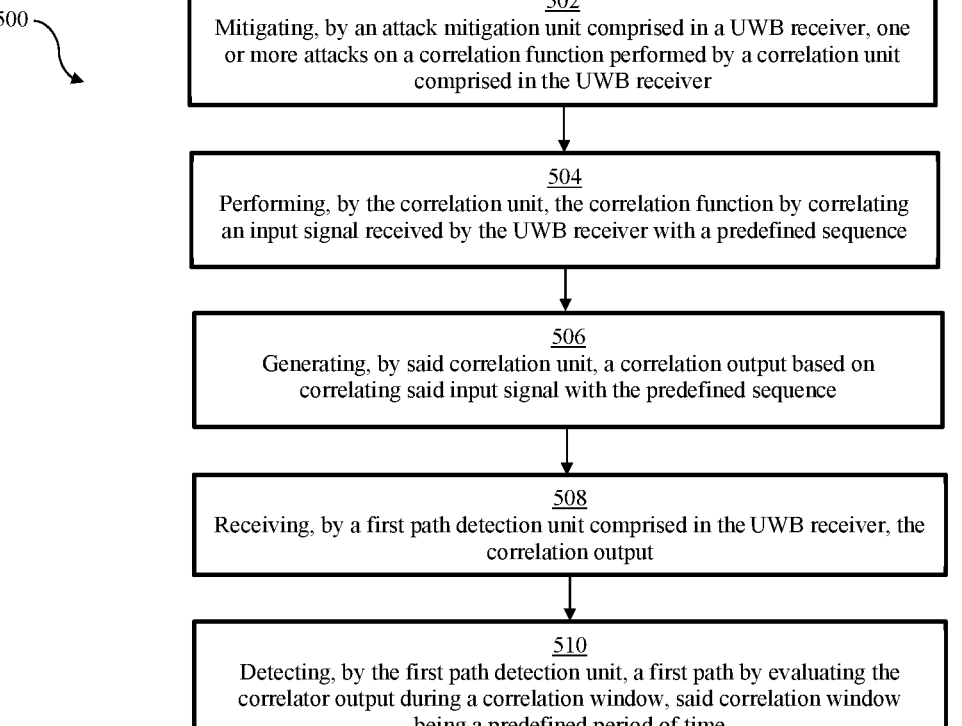

502
Mitigating, by an attack mitigation unit comprised in a UWB receiver, one or more attacks on a correlation function performed by a correlation unit comprised in the UWB receiver 504
Performing, by the correlation unit, the correlation function by correlating an input signal received by the UWB receiver with a predefined sequence 506
Generating, by said correlation unit, a correlation output based on correlating said input signal with the predefined sequence 508
Receiving, by a first path detection unit comprised in the UWB receiver, the correlation output 510
Detecting, by the first path detection unit, a first path by evaluating the correlator output during a correlation window, said correlation window being a predefined period of time

UWB RECEIVER AND METHOD OF OPERATION

CROSS-REFERENCE TO RELATED APPLICATIONS

This application claims the priority under 35 U.S.C. § 119 of European Patent application no. 22170140.2, filed on 26 Apr. 2022, the contents of which are incorporated by reference herein.

TECHNICAL FIELD

The present disclosure relates to an ultra-wideband (UWB) receiver. Furthermore, the present disclosure relates to a corresponding method of operating a UWB receiver, and to a computer program for carrying out said method.

BACKGROUND

UWB communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. UWB technology enables a high data throughput for communication devices and a high precision for the localization of devices. In particular, UWB technology may be used for so-called ranging operations, i.e. for determining the distance between communicating devices. Therefore, UWB technology may be used to advantage in various applications, such as automotive applications.

SUMMARY

In accordance with a first aspect of the present disclosure, a UWB receiver is provided, comprising: an attack mitigation unit configured to mitigate one or more attacks on a correlation function; a correlation unit configured to perform the correlation function by correlating an input signal received by the UWB receiver with a predefined sequence and to generate a correlation output based on correlating said input signal with the predefined sequence; and a first path detection unit configured to receive the correlation output and to detect a first path by evaluating the correlator output during a correlation window, said correlation window being a predefined period of time.

In one or more embodiments, the attack mitigation unit is configured to mitigate said attacks by adding extensions to the predefined sequence before the start of the predefined sequence and after the end of the predefined sequence, wherein said extensions include random data.

In one or more embodiments, the length of the extensions is equal to the length of the correlation window.

In one or more embodiments, the attack mitigation unit is configured to mitigate said attacks by detecting a maximum amplitude of the input signal provided to the correlation unit and by deriving a threshold for detecting the first path from said maximum amplitude of the input signal.

In one or more embodiments, the attack mitigation unit comprises a peak detection unit configured to detect said maximum amplitude of the input signal.

In one or more embodiments, the attack mitigation unit comprises a limiter operatively coupled to the correlation unit, and the attack mitigation unit is configured to mitigate said attacks by causing the limiter to clip high peak values of the input signal.

In one or more embodiments, the predefined sequence comprises a scrambled timestamp sequence (STS), the random data contains a random sequence of bits, and the attack mitigation unit is configured to mitigate the attacks on the correlation result by padding the random sequence of bits to the STS.

In one or more embodiments, a ranging system comprises a UWB receiver of the kind set forth.

In one or more embodiments, a vehicle comprises a ranging system of the kind set forth.

In accordance with a second aspect of the present disclosure, a method of operating a UWB receiver is conceived, the UWB receiver comprising an attack mitigation unit, a correlation unit and a first path detection unit, the method comprising: mitigating, by the attack mitigation unit, one or more attacks on a correlation function performed by the correlation unit; performing, by the correlation unit, the correlation function by correlating an input signal received by the UWB receiver with a predefined sequence; generating, by said correlation unit, a correlation output based on correlating said input signal with the predefined sequence; receiving, by the first path detection unit, the correlation output; and detecting, by the first path detection unit, a first path by evaluating the correlator output during a correlation window, said correlation window being a predefined period of time.

In one or more embodiments, the attack mitigation unit mitigates said attacks by adding extensions to the predefined sequence before the start of the predefined sequence and after the end of the predefined sequence, wherein said extensions include random data.

In one or more embodiments, the attack mitigation unit mitigates said attacks by detecting a maximum amplitude of the input signal provided to the correlation unit and by deriving a threshold for detecting the first path from said maximum amplitude of the input signal.

In one or more embodiments, the first path detection unit detects the first path if the correlation output is equal to or above the said threshold.

In one or more embodiments, the attack mitigation unit comprises a limiter operatively coupled to the correlation unit, and the attack mitigation unit mitigates said attacks by causing the limiter to clip high peak values of the input signal.

In accordance with a third aspect of the present disclosure, a computer program is provided, comprising executable instructions which, when executed by a UWB receiver, cause said UWB receiver to carry out a method of the kind set forth.

DESCRIPTION OF DRAWINGS

Embodiments will be described in more detail with reference to the appended drawings.

FIG. 5 shows an illustrative embodiment of a method of operating a UWB receiver.

DESCRIPTION OF EMBODIMENTS

Figure 1:
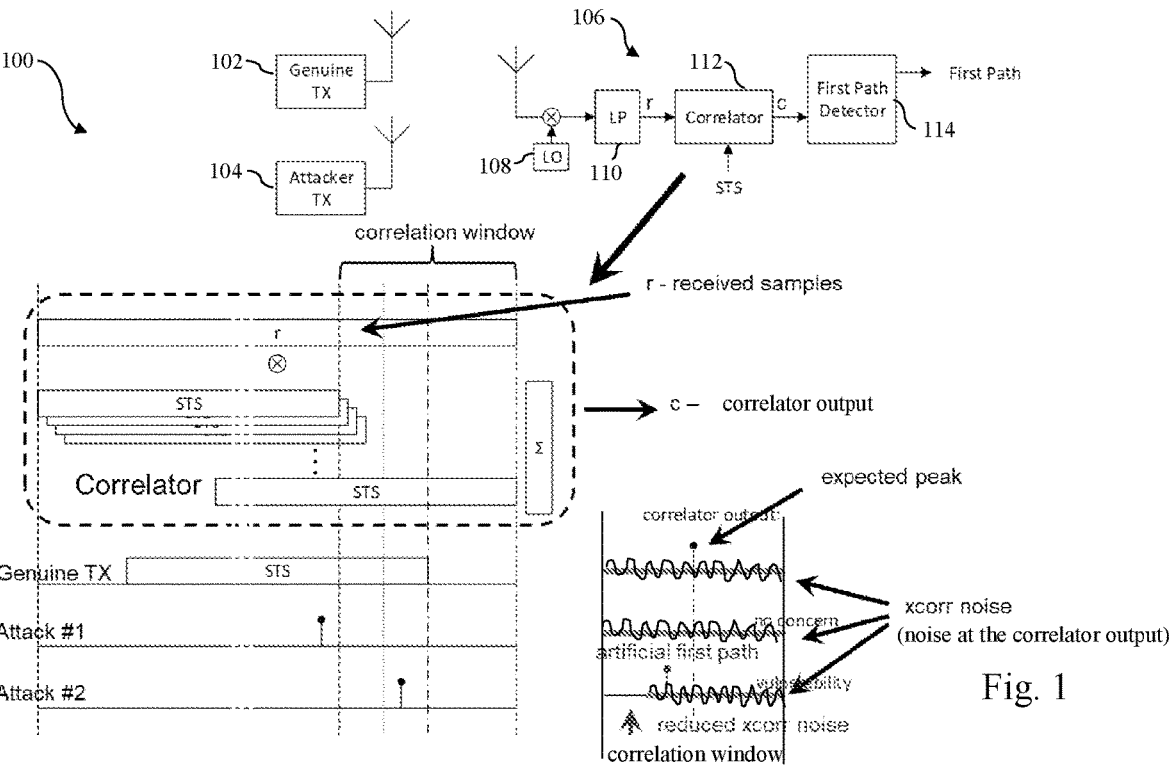
FIG. 1 shows an example of a ranging system and associated attacks.

As mentioned above, UWB communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. UWB technology enables a high data throughput for communication devices and a high precision for the localization of devices. In particular, UWB technology may be used for so-called ranging operations, i.e. for determining the distance between communicating devices. Therefore, UWB technology may be used to advantage in various applications, such as automotive applications.

In particular, UWB technology—also referred to as impulse-radio ultra-wideband (IR-UWB)—is an RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range relative to the other smart device. Therefore, UWB transceivers are typically configured to operate in a ranging mode. In another example, UWB technology may be used for accessing a building or a predefined space within a building.

In the ranging mode of operation, so-called UWB frames (i.e., UWB signals) will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged between the two devices. Then, a time of flight (ToF) is calculated based on the timestamps and a range (i.e., a distance) is calculated based on the ToF. Alternatively, a DS-TWR operation may be carried out (which may also be referred to as a ping-pong-ping operation). It is noted that the format of UWB frames is defined in the technical standard 802.15.4z-2020 (*IEEE Standard for Low-Rate Wireless Networks, Amendment 1: Enhanced Ultra Wideband (UWB) Physical Layers (PHYs) and Associated Ranging Techniques*).

As described in the high rate pulse (HRP) section of the technical standard 802.15.4z-2020, UWB frames comprise a so-called scrambled timestamp sequence (STS) field. The correlation of the STS is a security-sensitive function performed by a UWB receiver. However, a classical correlator may have a significant attack surface for an adversary. The adversary can drastically increase his chances of shortening the distance measurement result, by sending very strong pulses at specific times. In particular, a classical correlator convolves a time-reversed STS with incoming data for a certain observation period. Input samples at the end of the observation period do not influence the correlator output at the beginning of the observation period. An attacker can use this to manipulate the first path detector of the receiver, by sending strong pulses towards the end of the observation period. In a classical correlator, these strong pulses could create a step-like signal in the correlator output, which could erroneously be detected by the first path detector.

FIG. 1 shows an example of a ranging system 100 and associated attacks. The system 100 comprises a genuine transmitter 102 and a genuine receiver 106, which are configured to perform ranging operations between each other. The term "genuine" refers to the fact that the transmitter 102 and receiver 106 are not devices used by an attacker, but are used legitimately to estimate the distance between the transmitter 102 and receiver 106. The receiver 106 comprises a local oscillator 108, a low-pass filter 110, a correlator 112 and a first path detector 114. The correlator output is evaluated during a given period of time, which is referred to as the correlation window. The ranging result of a ranging exchange can be altered by the attacker transmitter 104 by sending strong pulses towards the end of the STS transmission of the genuine transmitter 102. In particular, a noise power estimate is performed over the samples in the left part of the correlator output. The noise power estimate is used to set a threshold for the first path detection. The first attack (attack #1) is not effective, because it raises the noise over the whole correlator output. The noise power estimate is increased, which raises the threshold, which in turn prevents the attack. However, the second attack (attack #2) is effective, because the noise is only raised over a part of the correlator output (see "reduced xcorr noise"). The noise estimation is reporting a too low noise power. Consequently, the threshold is set too low, and the attack succeeds.

Figure 2:
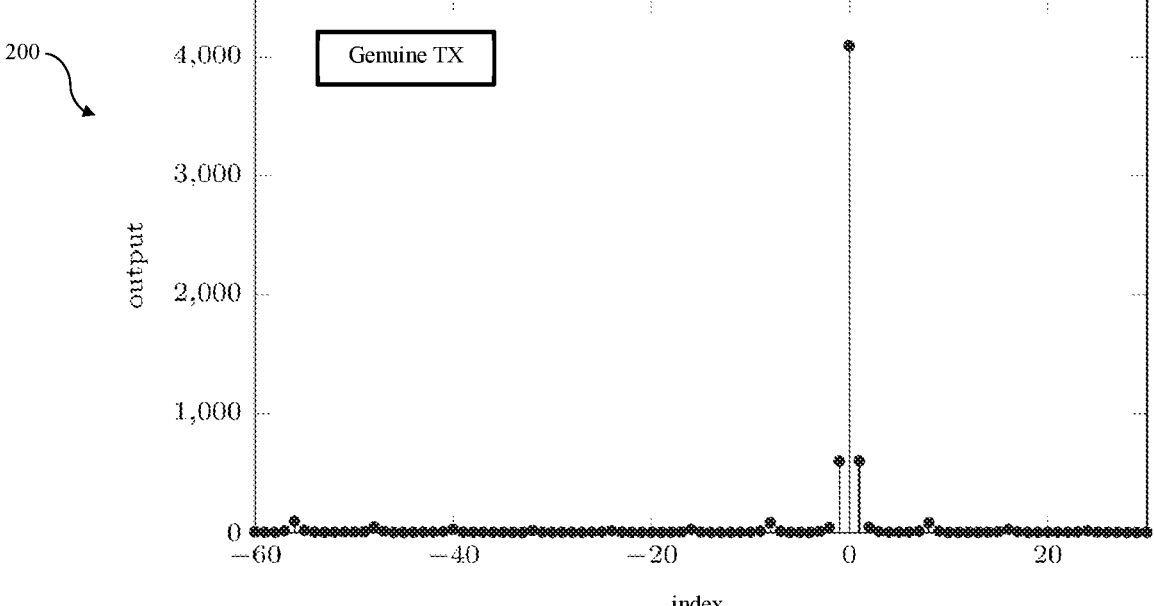
FIG. 2 shows a correlator output associated with a genuine transmitter.

FIG. 2 shows a correlator output 200 associated with the genuine transmitter shown in FIG. 1. In particular, the graph in FIG. 2 shows the correlator output on the vertical axis and an index on the horizontal axis. The genuine transmitter has transmitted an STS, which results in a high peak corresponding to a genuine first path at index 0.

Figure 3:
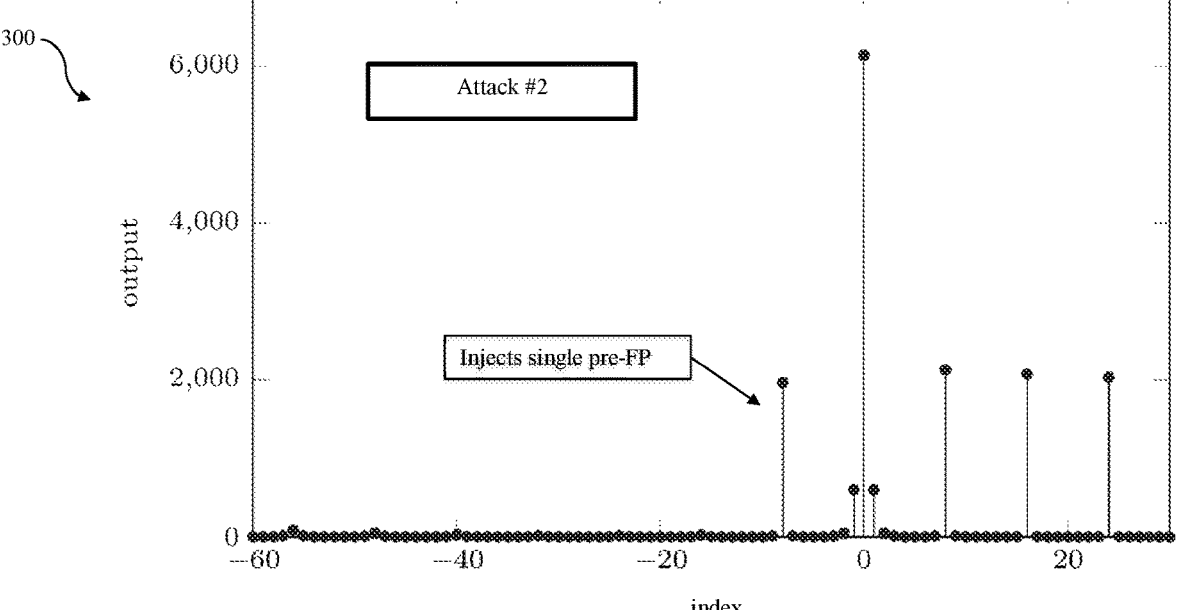
FIG. 3 shows a correlator output associated with an attacker transmitter.

FIG. 3 shows a correlator output 300 associated with the attacker transmitter shown in FIG. 1. In particular, the graph in FIG. 3 shows the correlator output on the vertical axis and an index on the horizontal axis. The genuine transmitter has transmitted an STS, which results in a high peak corresponding to a genuine first path at index 0. However, the attacker transmitter has also injected a single "pre-first path" before the genuine first path. As used herein, the term "pre-first path" refers to a step or increase in the noise at the correlator output. The increased noise at the correlator output may be erroneously recognized as the first path by the first path detector. In that case, the distance estimation may be based on the erroneously recognized first path instead of the genuine first path, and the determined distance may be significantly smaller than the real distance, resulting in a successful attack.

Now discussed are a UWB receiver and a corresponding method of operating a UWB receiver, which facilitate reducing the risk of a successful attack on the UWB receiver. It is noted that the presently disclosed UWB receiver may be used to advantage in a ranging system. Such a ranging system may for example be integrated into a vehicle.

Figure 4:
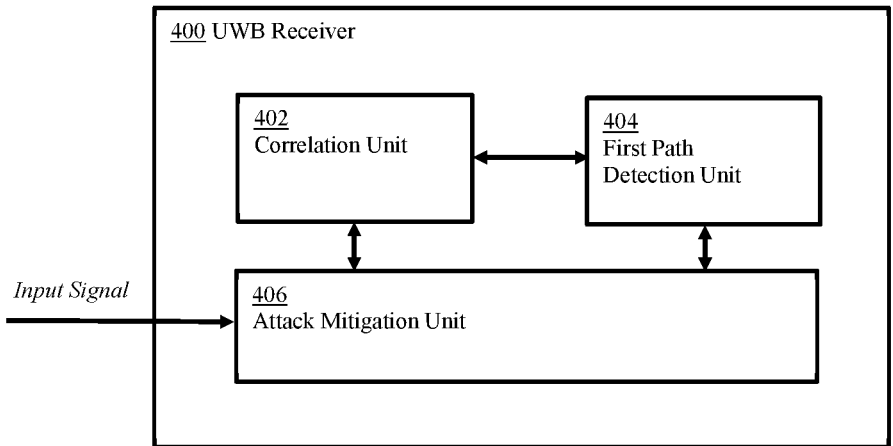
FIG. 4 shows an illustrative embodiment of a UWB receiver.

FIG. 4 shows an illustrative embodiment of a UWB receiver 400. The UWB receiver 400 comprises a correlation unit 402, a first path detection unit 404 and an attack mitigation unit 406. The attack mitigation unit 406 is configured to mitigate one or more attacks on a correlation function performed by the correlation unit 402. The correlation unit 402 is configured to perform the correlation function by correlating an input signal received by the UWB receiver 400 with a predefined sequence and to generate a correlation output based on correlating said input signal with the predefined sequence. Furthermore, the first path detection unit 404 is configured to receive the correlation output and to detect a first path by evaluating the correlator output during a correlation window, said correlation window being a predefined period of time. By mitigating attacks on the correlation function performed by the correlation unit 402, the risk of a successful attack on the UWB receiver may be reduced to a significant extent.

In one or more embodiments, the attack mitigation unit is configured to mitigate said attacks by adding extensions to the predefined sequence before the start of the predefined sequence and after the end of the predefined sequence, wherein said extensions include random data. It is noted that there is no overlap in time between the predefined sequence and the added random data. Thus, the predefined sequence is in fact extended with the random data towards both sides (i.e., the random data is added both before the start and after the end of the predefined sequence). In this way, the attacks may be mitigated in a relatively simple but effective manner. Thus, a first implementation of the attack mitigation is realized. This implementation of the attack mitigation may also be referred to as a "random shield". To effectively mitigate attacks, the random shield should cover the correlation window, in the sense that the extensions on both sides should have the same length as the correlation window. More specifically, the length of the extensions (i.e., the number of bits of the random data) should be equal to the length of the correlation window expressed in STS-bits.

Furthermore, in one or more embodiments, the attack mitigation unit is configured to mitigate said attacks by detecting a maximum amplitude of the input signal provided to the correlation unit and by deriving a threshold for detecting the first path from said maximum amplitude of the input signal. In this way, an alternative or additional way of mitigating the attacks is provided, which is also effective. Thus, a second implementation of the attack mitigation is realized. In a further practical realization, the attack mitigation unit comprises a peak detection unit configured to detect said maximum amplitude of the input signal. In a practical implementation, the first path detection unit is configured to detect the first path if the correlation output is equal to or above the said threshold.

In one or more embodiments, the attack mitigation unit comprises a limiter operatively coupled to the correlation unit, and the attack mitigation unit is configured to mitigate said attacks by causing the limiter to clip high peak values of the input signal. In this way, an alternative or additional way of mitigating the attacks is provided, which is also effective. In particular, an attacker may improve his odds by transmitting at a much higher power than the genuine signal. By limiting the amplitude the odds of the attacker are also limited. Thus, a third implementation of the attack mitigation is realized. It is noted that the term "clipping" refers to reducing values higher than a threshold to the threshold value. The skilled person will appreciate that the three different implementations of the attack mitigation may be used separately or in combination. In a further practical realization, the predefined sequence is an STS, and when the attack mitigation unit is configured to mitigate said attacks by adding random data to the predefined sequence, the random data may contain a random sequence of bits, and the attack mitigation unit may be configured to mitigate the attacks on the correlation function by padding the random sequence of bits to the STS. In this way, attacks on the STS correlation function may be mitigated in a relatively simple but effective manner.

FIG. 5 shows an illustrative embodiment of a method 500 of operating a UWB receiver. The method 500 comprises the following steps. At 502, an attack mitigation unit comprised in a UWB receiver mitigates one or more attacks on a correlation function performed by a correlation unit comprised in the UWB receiver. At 504, the correlation unit performs the correlation function by correlating an input signal received by the UWB receiver with a predefined sequence. Furthermore, at 506, said correlation unit generates a correlation output based on correlating said input signal with the predefined sequence. Furthermore, at 508, a first path detection unit comprised in the UWB receiver receives the correlation output. Finally, at 510, the first path detection unit detects a first path by evaluating the correlator output during a correlation window, said correlation window being a predefined period of time. As mentioned above, by mitigating attacks on the correlation function performed by the correlation unit, the risk of a successful attack on the UWB receiver may be reduced to a significant extent.

Figure 6:
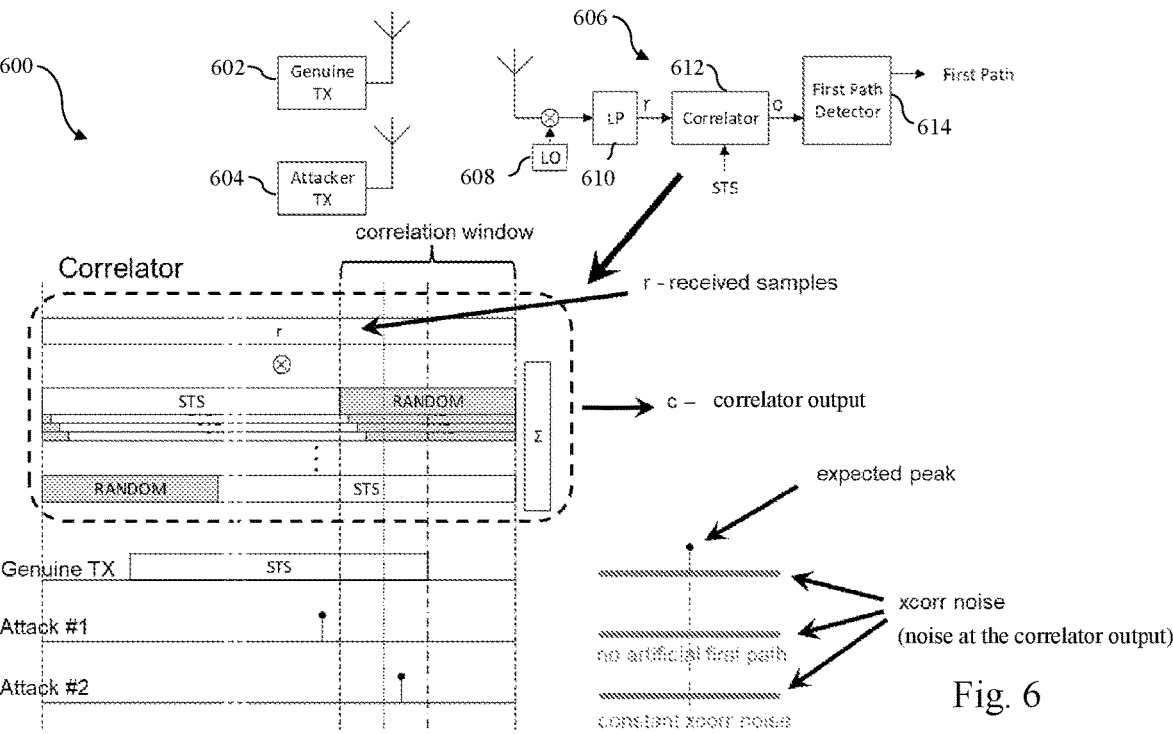
FIG. 6 shows an illustrative embodiment of a ranging system and associated attacks.

FIG. 6 shows an illustrative embodiment of a ranging system 600 and associated attacks. The system 600 comprises a genuine transmitter 602 and a genuine receiver 606, which are configured to perform ranging operations between each other. The receiver 606 comprises a local oscillator 608, a low-pass filter 610, a correlator 612 and a first path detector 614. The attacker transmitter 604 attempts to alter the ranging result of a ranging exchange by sending strong pulses towards the end of the STS transmission of the genuine transmitter 102. However, this attack is mitigated by an attack mitigation unit (not shown), which adds random data to the STS. As mentioned above, by adding random data to the predefined sequence, attacks may be mitigated in a relatively simple but effective manner. In this practical implementation, the random data are added to the STS which is used as the correlation sequence by the correlator 612.

Figure 7:
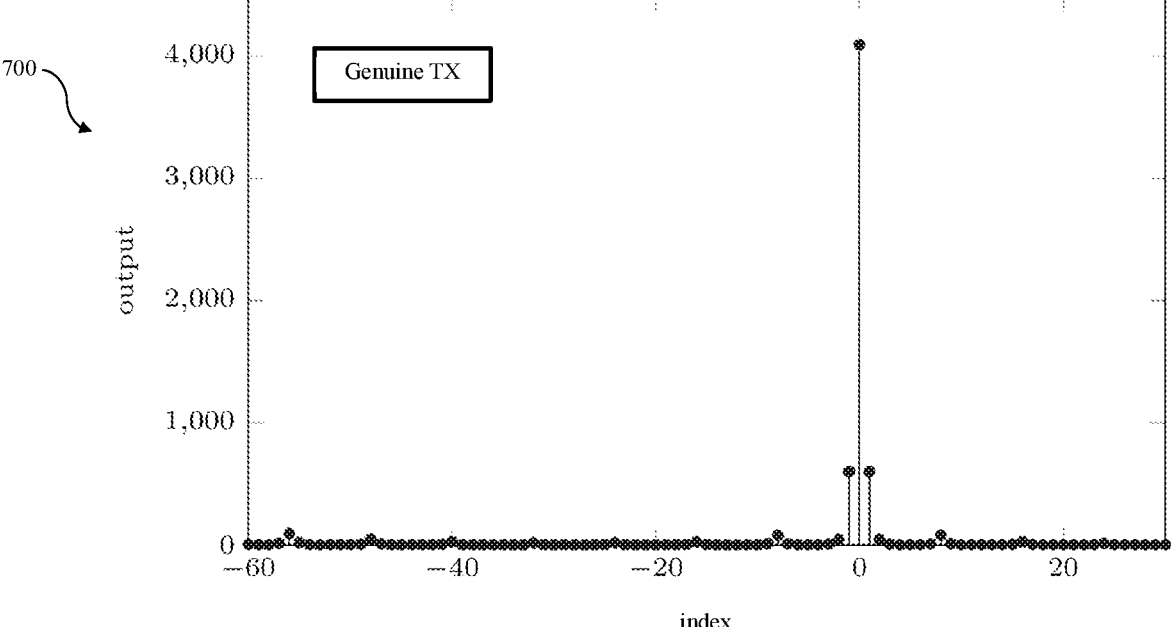
FIG. 7 shows another correlator output associated with a genuine transmitter.

FIG. 7 shows another correlator output 700 associated with a genuine transmitter. In particular, the graph in FIG. 7 shows the correlator output on the vertical axis and an index on the horizontal axis. The genuine transmitter has transmitted an STS, which results in a high peak corresponding to a genuine first path at index 0. It can be seen that the addition of the random data to the correlation sequence does not impair or affect the reception of a genuine signal.

Figure 8:
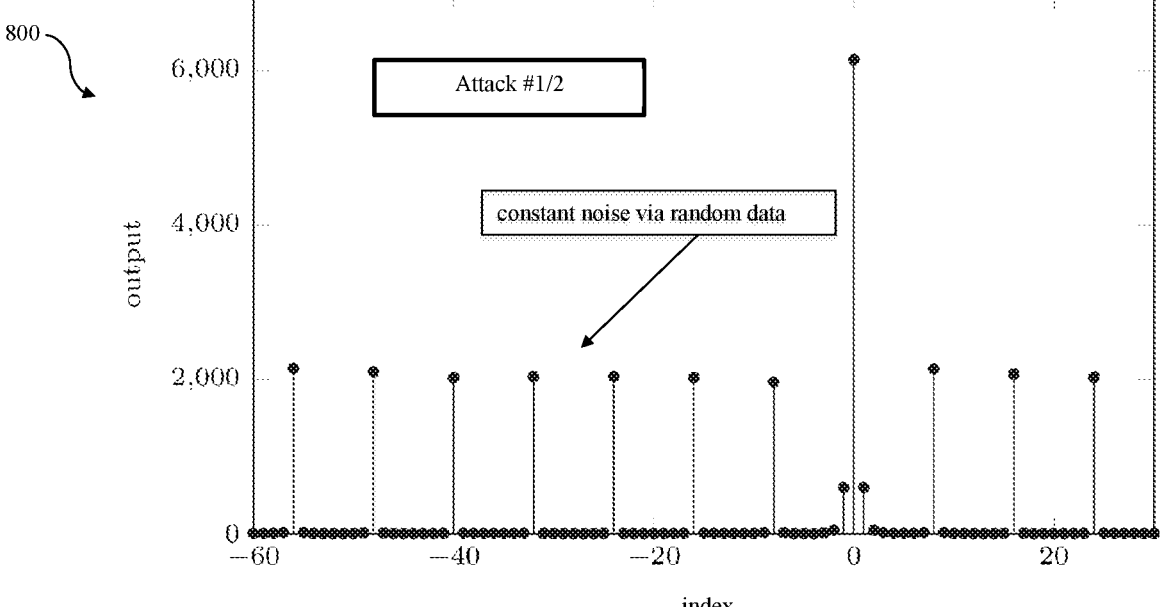
FIG. 8 shows another correlator output associated with an attacker transmitter.

FIG. 8 shows another correlator output 800 associated with an attacker transmitter. In particular, the graph in FIG. 8 shows the correlator output on the vertical axis and an index on the horizontal axis. The genuine transmitter has transmitted an STS, which results in a high peak corresponding to a genuine first path at index 0. However, the attacker transmitter has also injected a single "pre-first path", in the sense as described above. In particular, the attacker has transmitted a strong pulse towards the end of the STS, to create a step or increase in the noise at the correlator output. This attack is mitigated by the random shield. Since the attack mitigation unit has added random data to the STS, a constant noise is produced, which will mitigate the effect of the increased noise at the correlator output. Therefore, the attack is successfully countered, and the genuine first path will be recognized as the first path by the first path detection unit.

Figure 9:
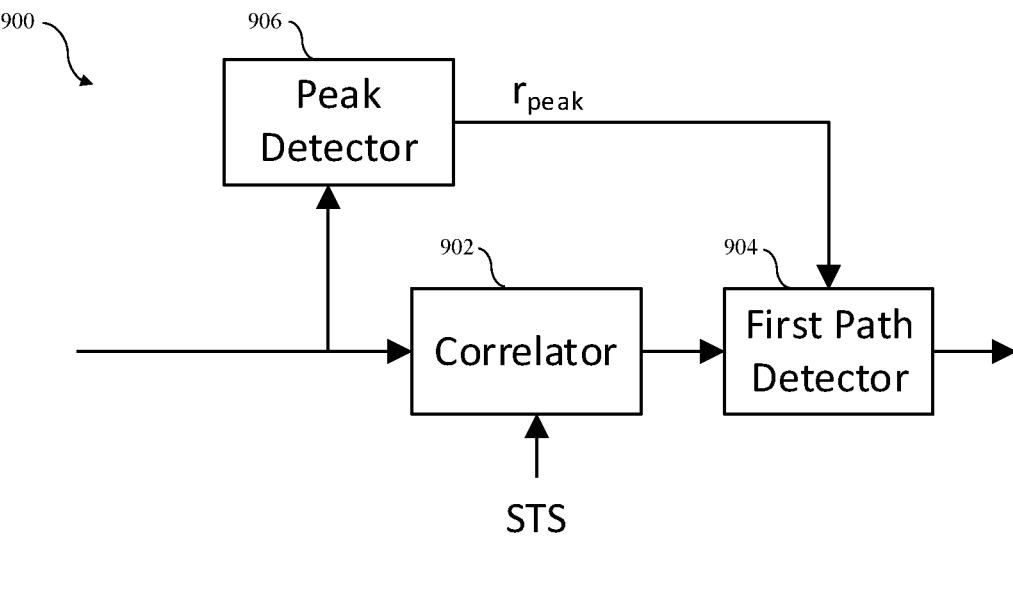
FIG. 9 shows an illustrative embodiment of a subsystem of a UWB receiver.

FIG. 9 shows an illustrative embodiment of a subsystem 900 of a UWB receiver. The subsystem 900 includes a correlator 902, a first path detector 904 and a peak detector 906. As mentioned above, the attack mitigation unit may be configured to mitigate attacks by detecting a maximum amplitude of the input signal and by deriving a threshold for detecting the first path from said maximum amplitude of the input signal. FIG. 9 shows a subsystem 900 capable of performing these functions. In particular, the maximum amplitude may be detected by the peak detector 906 before the input signal is correlated by the correlator 902, and this maximum amplitude may be used to derive a minimum threshold for the first path search performed by the first path detector 904. It is noted that the threshold for the first path search is typically derived from a noise power estimate. By deriving the threshold from the maximum amplitude of the input signal, a secure minimum threshold may be determined, which significantly reduces the likelihood of a successful attack. For instance, the minimum threshold may be calculated as shown in equation 1. In this equation, $t_{min}$ represents the minimum threshold for the first path search, $r_{peak}$ represents the maximum amplitude of the input signal, SBW represents the first path search back window length, and L represents the STS up-sampling factor as defined in the technical standard 802.15.4z-2020.

$$t_{min} = r_{peak} \frac{SBW}{L} \qquad \text{(Equation 1)}$$

Figure 10:
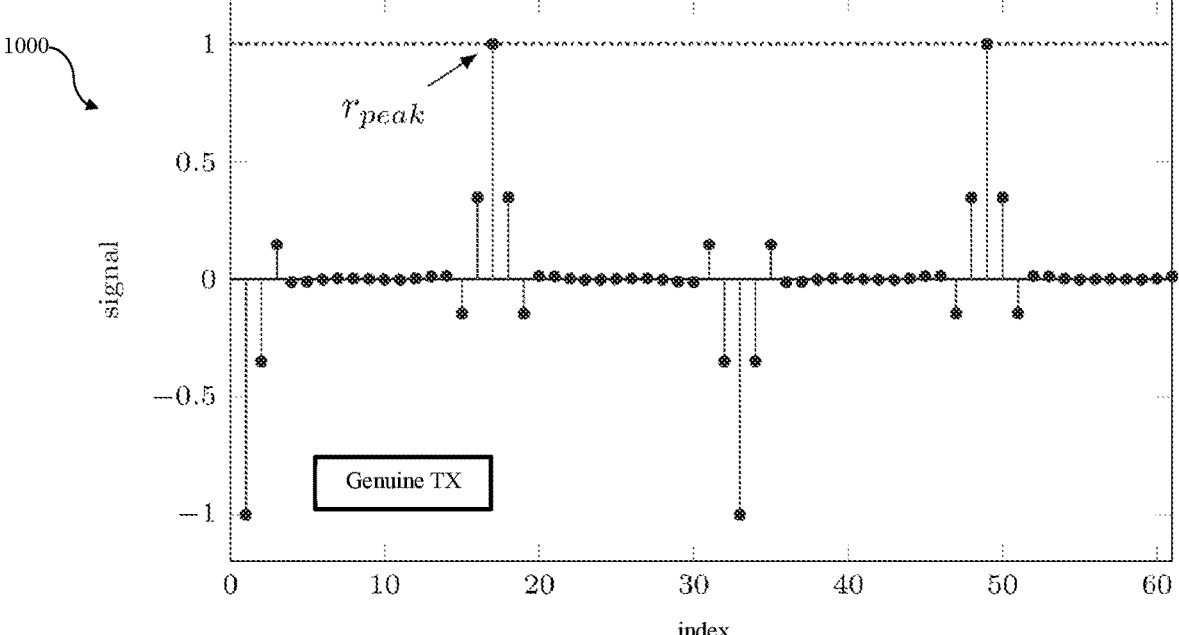
FIG. 10 shows an input signal associated with a genuine transmitter.

FIG. 10 shows an input signal 1000 associated with a genuine transmitter. In particular, it is shown how the maximum amplitude $r_{peak}$ of an input signal is determined. The graph in FIG. 10 shows the input signal on the vertical axis and an index on the horizontal axis. The input signal represents a typical noise level associated with transmission of UWB pulses by a genuine transmitter.

Figure 11:
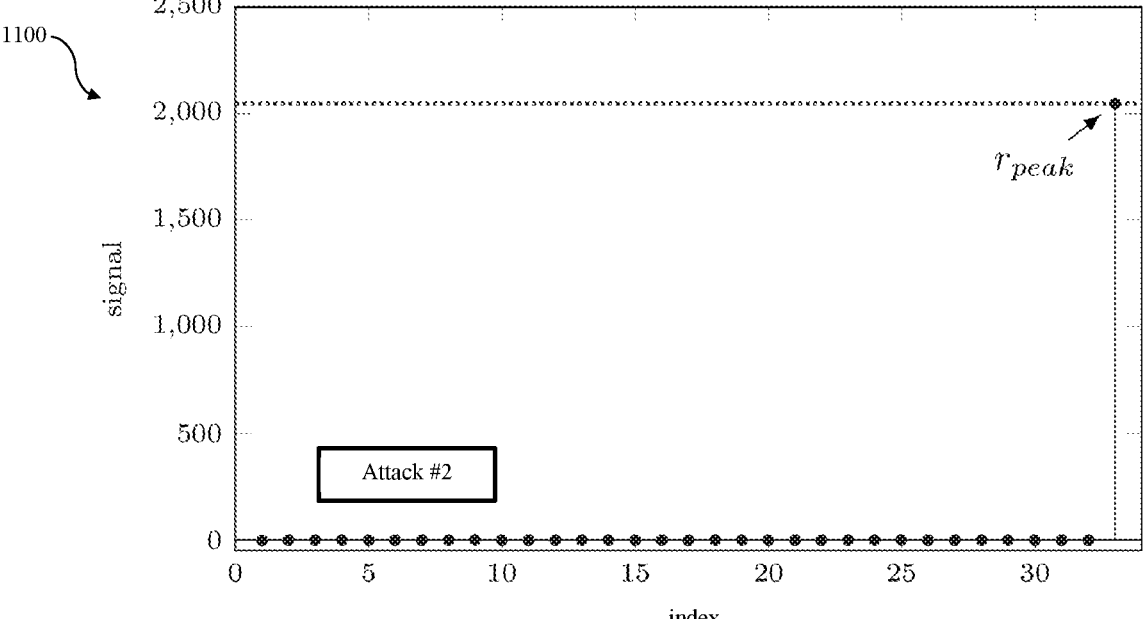
FIG. 11 shows an input signal associated with an attacker transmitter.

FIG. 11 shows an input signal 1100 associated with an attacker transmitter. In particular, it is shown how the maximum amplitude $r_{peak}$ of an input signal is determined. The graph in FIG. 11 shows the input signal on the vertical axis and the chip index on the horizontal axis. As can be seen, the maximum amplitude of the input signal transmitted by the attacker transmitter is higher than the typical noise level associated with the genuine transmitter (show in FIG. 10). By deriving a threshold for the first path detection from the maximum amplitude of input signals monitored for a certain amount of time, including from attack signals, the artificial first paths introduced by the attack signals may effectively be filtered out. In other words, a suitable lower bound on the noise threshold may be determined, such that the artificial first paths introduced by the attack signals may be regarded as noise as well.

Figure 12:
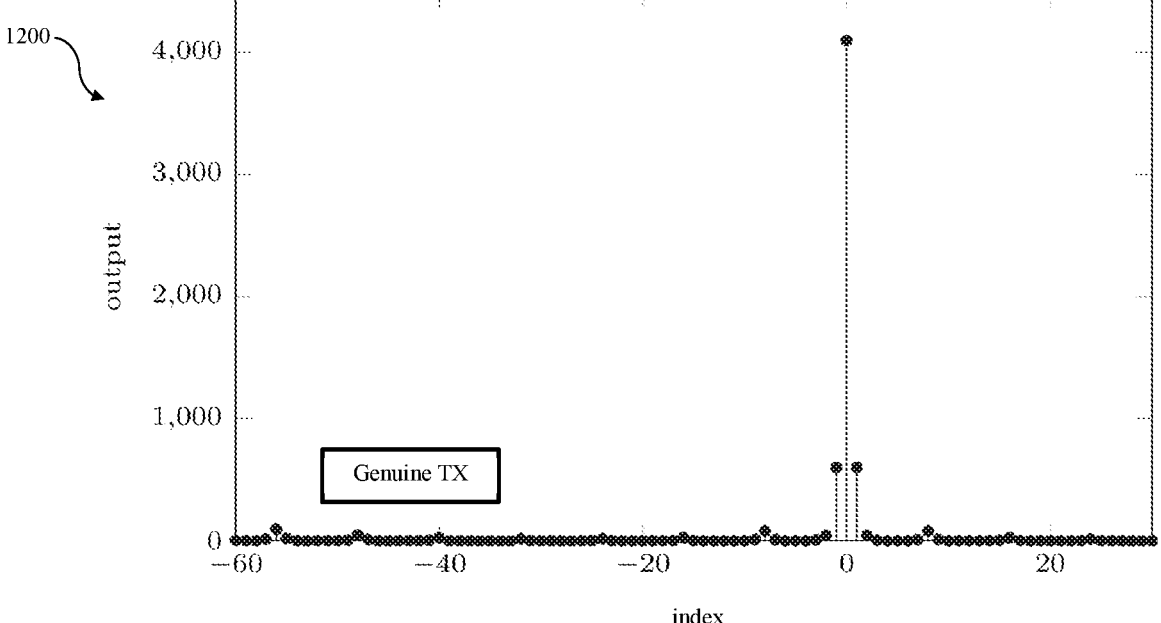
FIG. 12 shows a further correlator output associated with a genuine transmitter.

FIG. 12 shows a further correlator output 1200 associated with a genuine transmitter. In particular, the graph in FIG. 12 shows the correlator output on the vertical axis and an index on the horizontal axis. The genuine transmitter has transmitted a pulse, which results in a high peak corresponding to a genuine first path at index 0. It can be seen that the attack mitigation, which is implemented in this case by deriving a threshold for the first path detection from the maximum amplitude of input signals, does not impair or affect the reception of a genuine output signal. Furthermore, it is noted that the lower bound on the threshold (r_peak) is applied but not shown, because it is greatly below the correlator noise.

Figure 13:
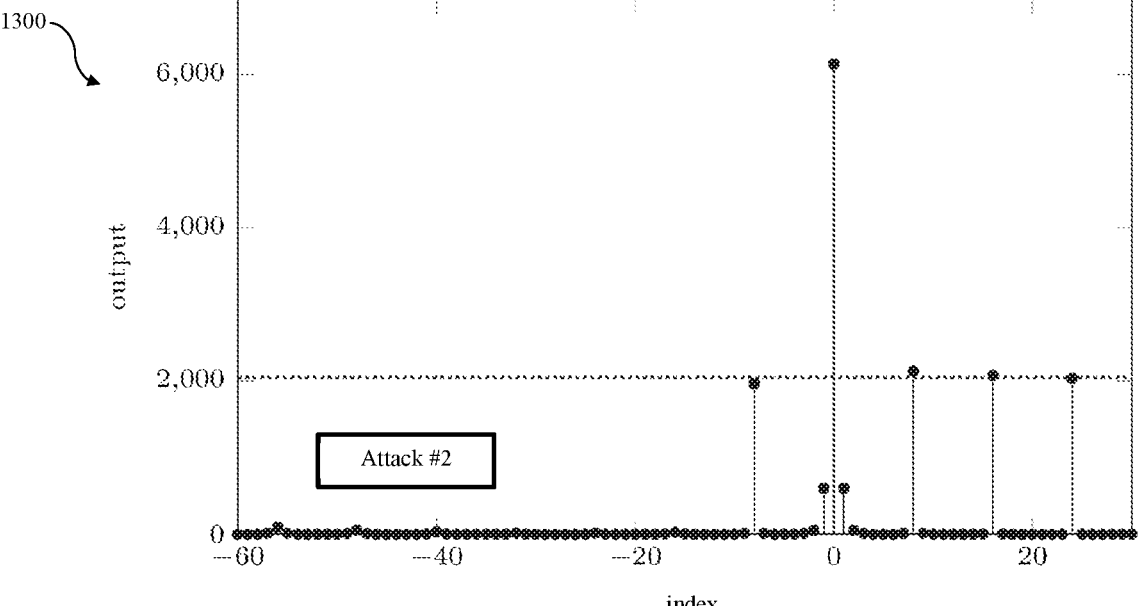
FIG. 13 shows a further correlator output associated with an attacker transmitter.

FIG. 13 shows a further correlator output 1300 associated with an attacker transmitter. In particular, the graph in FIG. 13 shows the correlator output on the vertical axis and an index on the horizontal axis. The genuine transmitter has transmitted a pulse, which results in a high peak corresponding to a genuine first path at index 0. However, the attacker transmitter has also injected a single "pre-first path", in the sense as described above. In particular, the attacker has transmitted a strong pulse towards the end of the STS, to create a step or increase in the noise at the correlator output. Since the threshold for the first path detection has been adapted, the increased noise at the correlator output will result in a rejection. Therefore, the attack is successfully countered, and the genuine first path will be recognized as the first path by the first path detection unit.

Figure 14:
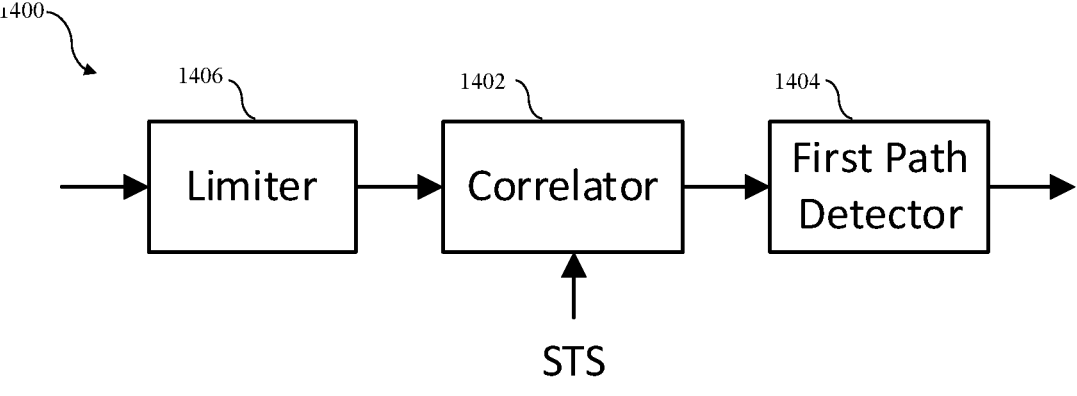
FIG. 14 shows an illustrative embodiment of a subsystem of a UWB receiver.

FIG. 14 shows an illustrative embodiment of a subsystem 1400 of a UWB receiver. The subsystem 1400 includes a correlator 1402, a first path detector 1404 and a limiter 1406. In this case, the attack mitigation is implemented using a limiter 1406 operatively coupled to the correlator 1402. More specifically, attacks on the correlation function may be mitigated by causing the limiter 1406 to clip high peak values of the input signal. In other words, the input level of the correlator 1402 is limited, in that high peak values of the input signal are clipped to a certain limit.

Figure 15:
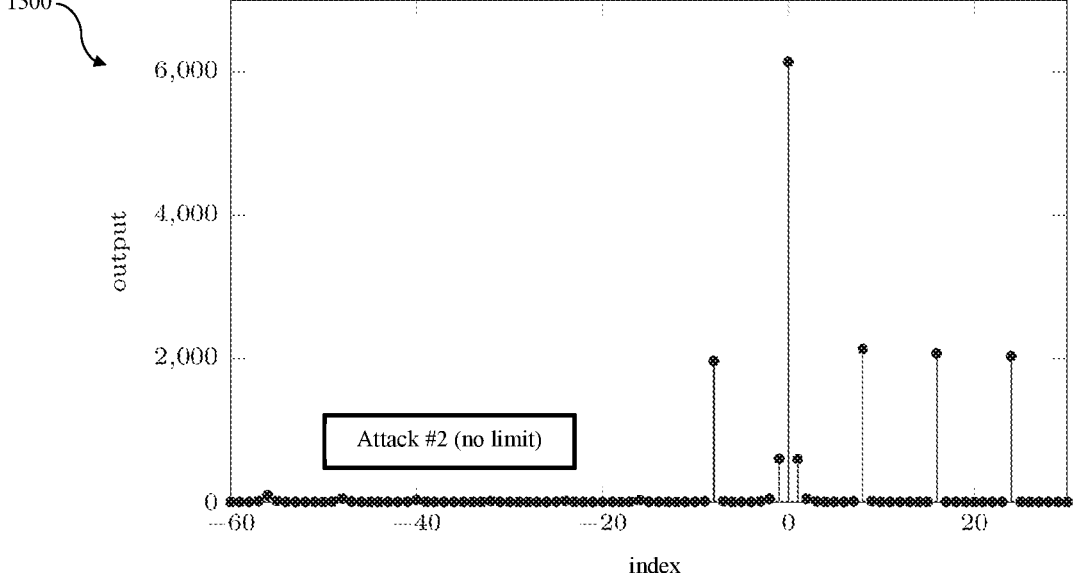
FIG. 15 shows a further correlator output associated with an attacker transmitter.

FIG. 15 shows a further correlator output 1500 associated with an attacker transmitter. In particular, the graph in FIG. 15 shows the correlator output on the vertical axis and an index on the horizontal axis. The genuine transmitter has transmitted a pulse, which results in a high peak corresponding to a genuine first path at index 0. However, the attacker transmitter has also injected a single "pre-first path", in the sense as described above. In particular, the attacker has transmitted a strong pulse towards the end of the STS, to create a step or increase in the noise at the correlator output. If the input level is not limited and no other countermeasures are implemented, the increased noise at the correlator output will be detected by the first path detector 1404, which will result in a successful distance reduction attack.

Figure 16:
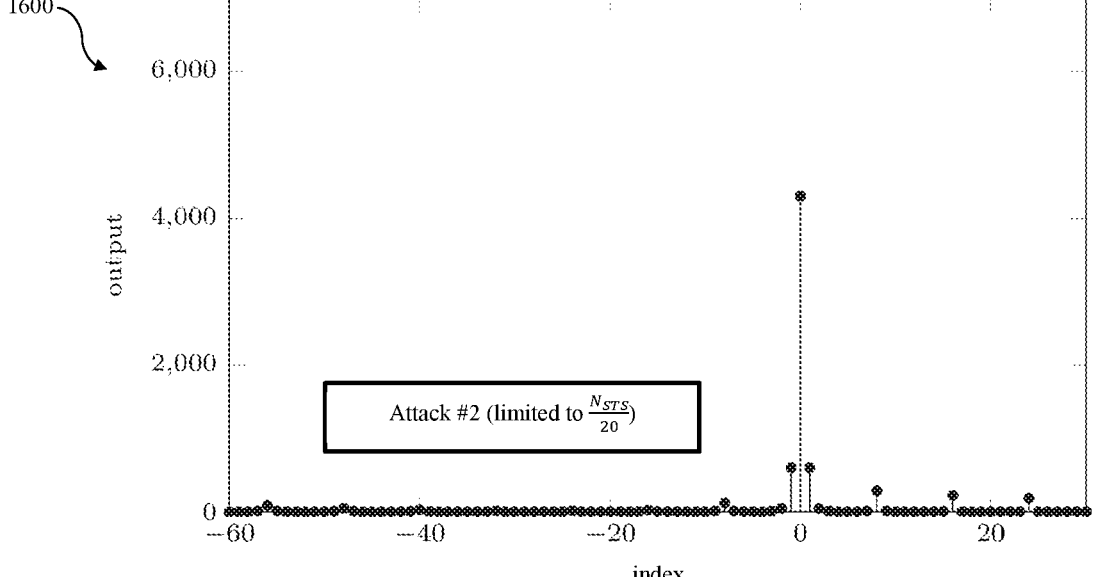
FIG. 16 shows a further correlator output associated with an attacker transmitter.

FIG. 16 shows a further correlator output 1600 associated with an attacker transmitter. In particular, the graph in FIG. 16 shows the correlator output on the vertical axis and an index on the horizontal axis. The genuine transmitter has transmitted a pulse, which results in a high peak corresponding to a genuine first path at index 0. However, the attacker transmitter has also injected a single "pre-first path", in the sense as described above. In particular, the attacker has transmitted a strong pulse towards the end of the STS, to create a step or increase in the noise at the correlator output. Since the input level of the correlator 1402 has been limited by the limiter 1406, this increased noise at the correlator output will not be detected by the first path detector 1404. In other words, by limiting the amplitude of the pulse transmitted by the attacker, the effect of the increased noise at the correlator output is mitigated. Therefore, the distance reduction attack is successfully countered, and the genuine first path will be recognized as the first path by the first path detection unit.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 ranging system and associated attacks
102 genuine transmitter
104 attacker transmitter
106 genuine receiver
108 local oscillator
110 low-pass filter
112 correlator
114 first path detector
200 correlator output associated with genuine transmitter
300 correlator output associated with attacker transmitter
400 UWB receiver
402 correlation unit
404 first path detection unit
406 attack mitigation unit
500 method of operating a UWB receiver
502 mitigating, by an attack mitigation unit comprised in a UWB receiver, one or more attacks on a correlation function performed by a correlation unit comprised in the UWB receiver
504 performing, by the correlation unit, the correlation function by correlating an input signal received by the UWB receiver with a predefined sequence
506 generating, by said correlation unit, a correlation output based on correlating said input signal with the predefined sequence
508 receiving, by a first path detection unit comprised in the UWB receiver, the correlation output 510 detecting, by the first path detection unit, a first path by evaluating the correlator output during a correlation window, said correlation window being a predefined period of time 600 ranging system and associated attacks 602 genuine transmitter 604 attacker transmitter 606 genuine receiver 608 local oscillator 610 low-pass filter 612 correlator 614 first path detector 700 correlator output associated with genuine transmitter 800 correlator output associated with attacker transmitter 900 subsystem of UWB receiver 902 correlator 904 first path detector 906 peak detector 1000 input signal associated with genuine transmitter 1100 input signal associated with attacker transmitter 1200 correlator output associated with genuine transmitter 1300 correlator output associated with attacker transmitter 1400 subsystem of UWB receiver 1402 correlator 1404 first path detector 1406 limiter 1500 correlator output associated with attacker transmitter 1600 correlator output associated with attacker transmitter

The invention claimed is:

1. An ultra-wideband (UWB) receiver, comprising:
a correlation unit configured to perform a correlation function by correlating an input signal received by the UWB receiver with a predefined sequence and to generate a correlation output based on correlating said input signal with the predefined sequence, wherein the predefined sequence comprises a scrambled timestamp sequence (STS);
a first path detection unit configured to receive the correlation output and to detect a first path by evaluating the correlator output during a correlation window, said correlation window being a predefined period of time; and
an attack mitigation unit configured to mitigate one or more attacks on the correlation function by adding extensions to the predefined sequence before a start of the predefined sequence and after an end of the predefined sequence by padding a random sequence of bits to the STS.

2. The UWB receiver of claim 1, wherein a length of the extensions is equal to a length of the correlation window.

3. The UWB receiver of claim 1, wherein the UWB receiver is included in a vehicle.

4. An ultra-wideband (UWB) receiver, comprising:
a correlation unit configured to perform a correlation function by correlating an input signal received by the UWB receiver with a predefined sequence and to generate a correlation output based on correlating said input signal with the predefined sequence;
a first path detection unit configured to receive the correlation output and to detect a first path by evaluating the correlator output during a correlation window, said correlation window being a predefined period of time; and an attack mitigation unit configured to mitigate one or more attacks on the correlation function by detecting a maximum amplitude of the input signal provided to the correlation unit and by deriving a threshold for detecting the first path from said maximum amplitude of the input signal.

5. The UWB receiver of claim 4, wherein the attack mitigation unit comprises a peak detection unit configured to detect said maximum amplitude of the input signal.

6. The UWB receiver of claim 4, wherein the UWB receiver is included in a vehicle.

7. An ultra-wideband (UWB) receiver, comprising:
a correlation unit configured to perform a correlation function by correlating an input signal received by the UWB receiver with a predefined sequence and to generate a correlation output based on correlating said input signal with the predefined sequence;
a first path detection unit configured to receive the correlation output and to detect a first path by evaluating the correlator output during a correlation window, said correlation window being a predefined period of time; and
an attack mitigation unit configured to mitigate one or more attacks on the correlation function, wherein the attack mitigation unit comprises a limiter operatively coupled to the correlation unit, and wherein the attack mitigation unit is configured to mitigate said attacks by causing the limiter to clip high peak values of the input signal.

8. The UWB receiver of claim 7, wherein the UWB receiver is included in a vehicle.

9. A method of operating an ultra-wideband (UWB) receiver, the UWB receiver comprising an attack mitigation unit, a correlation unit and a first path detection unit, the method comprising:
mitigating, by the attack mitigation unit, one or more attacks on a correlation function performed by the correlation unit;
performing, by the correlation unit, the correlation function by correlating an input signal received by the UWB receiver with a predefined sequence;
generating, by said correlation unit, a correlation output based on correlating said input signal with the predefined sequence;
receiving, by the first path detection unit, the correlation output; and
detecting, by the first path detection unit, a first path by evaluating the correlator output during a correlation window, said correlation window being a predefined period of time,
wherein mitigating, by the attack mitigation unit, said one or more attacks on the correlation function comprises at least one of:
adding extensions to the predefined sequence before a start of the predefined sequence and after an end of the predefined sequence, wherein the predefined sequence comprises a scrambled timestamp sequence (STS) and the extensions comprise a random sequence of bits;
detecting a maximum amplitude of the input signal provided to the correlation unit and by deriving a threshold for detecting the first path from said maximum amplitude of the input signal; or
causing a limiter operatively coupled to the correlation unit to clip high peak values of the input signal.

10. The method of claim 9, wherein:

mitigating said one or more attacks on the correlation function includes adding extensions to the predefined sequence before the start of the predefined sequence and after the end of the predefined sequence, wherein the predefined sequence comprises the STS; and the attack mitigation unit mitigates the attacks on the correlation result by padding the random sequence of bits to the STS.

11. The method of claim 10, wherein a length of the extensions is equal to a length of the correlation window.

12. The method of claim 9, wherein mitigating said one or more attacks on the correlation function includes detecting the maximum amplitude of the input signal provided to the correlation unit and by deriving the threshold for detecting the first path from said maximum amplitude of the input signal.

13. The method of claim 12, wherein a peak detection unit comprised in the attack mitigation unit detects said maximum amplitude of the input signal.

14. The method of claim 12, wherein the first path detection unit detects the first path if the correlation output is equal to or above the said threshold.

15. The method of claim 9, wherein mitigating said one or more attacks on the correlation function includes causing the limiter to clip high peak values of the input signal.

16. A non-transitory computer-readable medium storing machine instructions which, when executed by at least one processor, cause the at least one processor to:

cause an attack mitigation unit to mitigate one or more attacks on a correlation function performed by a correlation unit, wherein the attack mitigation unit and the correlation unit are included in an ultra-wideband (UWB) receiver;

cause the correlation unit to perform the correlation function by correlating an input signal received by the UWB receiver with a predefined sequence;

cause the correlation unit to generate a correlation output based on correlating said input signal with the predefined sequence;

cause a first path detection unit to receive the correlation output, wherein the first path detection unit is included in the UWB receiver; and cause the first path detection unit to detect a first path by evaluating the correlator output during a correlation window, said correlation window being a predefined period of time, wherein causing said attack mitigation unit to mitigate said one or more attacks on the correlation function comprises at least one of:

causing said attack mitigation unit to add extensions to the predefined sequence before a start of the predefined sequence and after an end of the predefined sequence, wherein the predefined sequence comprises a scrambled timestamp sequence (STS) and the extensions comprise a random sequence of bits;

causing said attack mitigation unit to detect a maximum amplitude of the input signal provided to the correlation unit and to derive a threshold for detecting the first path from said maximum amplitude of the input signal; or causing a limiter of said attack mitigation unit that is operatively coupled to the correlation unit to clip high peak values of the input signal.

17. The non-transitory computer-readable medium of claim 16, wherein the machine instructions to cause the attack mitigation unit to mitigate one or more attacks include machine instructions to cause the attack mitigation unit to add extensions to the predefined sequence before the start of the predefined sequence and after the end of the predefined sequence, wherein the predefined sequence comprises the STS and the extensions comprise the random sequence of bits.

18. The non-transitory computer-readable medium of claim 17, wherein a length of the extensions is equal to a length of the correlation window.

19. The non-transitory computer-readable medium of claim 16, wherein the machine instructions to cause the attack mitigation unit to mitigate one or more attacks include machine instructions to cause the attack mitigation unit to detect the maximum amplitude of the input signal provided to the correlation unit and to derive the threshold for detecting the first path from said maximum amplitude of the input signal.

20. The non-transitory computer-readable medium of claim 16, wherein the machine instructions to cause the attack mitigation unit to mitigate one or more attacks include machine instructions to cause the limiter of said attack mitigation unit that is operatively coupled to the correlation unit to clip high peak values of the input signal.

\* \* \* \* \*